US00RE36921E

United States Patent [19]

Bushman et al.

[11] E Patent Number: Re. 36,921

[45] **Reissued Date of Patent: *Oct. 17, 2000**

[54] LOW PROFILE KILN APPARATUS AND METHOD OF USING SAME

[75] Inventors: James D. Bushman, Pittsburgh; Marion A. Rogallo, Irwin, both of Pa.

[73] Assignee: Swindell Dressler International Corporation, Pittsburgh, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 08/927,635

[22] Filed: Sep. 5, 1997

Related U.S. Patent Documents

Reissue of:

[64] Patent No.: 4,773,850
Issued: Sep. 27, 1988
Appl. No.: 07/086,251
Filed: Aug. 14, 1987

U.S. Applications:

[63] Continuation of application No. 06/850,116, Apr. 10, 1986, abandoned.

[51] Int. Cl.[7] ..... F27D 13/00

[52] U.S. Cl. ..... 432/5; 432/9; 432/12; 432/24; 432/241

[58] Field of Search ..... 432/5, 9, 12, 18, 432/24, 239, 241, 258, 259

[56] References Cited

U.S. PATENT DOCUMENTS

| | | | |
|---|---|---|---|
| 3,170,681 | 2/1965 | Davies | 432/24 |
| 3,204,341 | 9/1965 | Whitsel, Jr. | 432/12 |
| 3,322,413 | 5/1967 | Orth | 432/9 |
| 3,759,659 | 9/1973 | Bay | 432/24 |
| 3,868,094 | 2/1975 | Hovis | 432/9 |
| 4,030,879 | 6/1977 | Stanasila et al. | 432/258 |
| 4,384,848 | 5/1983 | Marazzi | 432/18 |
| 4,560,346 | 12/1985 | Schulz | 432/24 |
| 4,596,526 | 6/1986 | Soliman | 432/24 |

OTHER PUBLICATIONS

F. E. Jeffers; "The 'One–High' Kiln in 1972"; Brick & Clay Record; Apr., 1972; pp. 36–38.

Leo E. Oberschmidt; "'One High' Features Production Cycle of Less Than 24 Hrs."; Brick & Clay Record, Oct., 1967; pp. 50–52.

J.J. Svec; "General Shale's—'The One High'"; Brick & Clay Record; Oct. 1967, pp. 48–49 and 82–85.

*Primary Examiner*—Mark H. Paschall
*Assistant Examiner*—Gregory A. Wilson
*Attorney, Agent, or Firm*—Pillsbury Madison & Sutro LLP

[57] ABSTRACT

A manufacturing method and apparatus is provided for making building and other types of brick. The apparatus requires a minimum of excess (or surge) production, utilizes automated equipment which is highly dependable and which is easily operated and controlled. The apparatus comprises an automated low profile dryer and kiln in conjunction with an automated brick handling system including specially designed lighweight kiln cars.

16 Claims, 6 Drawing Sheets

LOW PROFILE KILN APPARATUS AND METHOD OF USING SAME

Matter enclosed in heavy brackets [ ] appears in the original patent but forms no part of this reissue specification; matter printed in italics indicates the additions made by reissue.

This application is a continuation, Ser. No. 850,116, filed Apr. 10, 1986, now abandoned.

BACKGROUND OF THE INVENTION

1. Field of the Invention

The present invention relates to an apparatus and method of efficiently producing brick and more specifically relates to an automated low profile dryer, kiln and brick handling system wherein the kiln utilizes a shortened brick firing cycle and requires a minimum of excess or surge brick production.

2. Description of the Prior Art

Virtually all brick production plants in the United States operate in an identical manner. Typically, the brick making machinery is run five days per week for one shift while the kiln and dryer are run continuously. The kilns, which are cosntructed of refractories, must be run around the clock, 365 days per year since intermittent shut down of the kiln will, in most cases, result in damage to the refractory lining. Furthermore, even in those cases where the kiln can be shutdown without damage to the lining, the shutdown cycle (i.e., the time required to safely bring the kiln from operating temperature to ambient temperature) as well as the startup cycle (i.e., the time required to safely bring the kiln from ambient temperature to operating temperature) have both typically been on the order of several days duration.

Thus, in order for the kilns to operate continuously, the production capacity of the brick making equipment must be over four times the throughput of the kiln and dryer so that enough product can be made in a 40 hour work week to satisfy the continuous running of the kiln and dryer. Further, as the unfired (green) brick product accumulates through the week, it must be stored until the time when it is eventually fed to the kiln, such as over weekend periods. Extra kiln cars and extra storage space in the brick producing plants, needed to accomodate the excess unfired brick, add significantly to the overall cost of the plant without providing increased capacity.

Existing brick producing plants have typically required many operators working per shift in order to maintain production. Operators were likewise needed during weekends and holidays due to the continuously running kilns, thereby greatly increasing personnel costs.

In the past, brick producing plants have utilized a kiln firing time on the order of 30–80 hours, depending upon the particular raw material used to make the brick. Such lengthy firing times were necessary due to the amount and manner in which the bricks were passed through the kiln. In most brick producing plants, the bricks are stacked on the deck of a kiln car traveling on tracks through the kiln. An unloaded kiln car has typically had a weight in the range of about 125 to 150 lbs/ft$^2$ of deck space. Furthermore, the bricks are typically stacked on the kiln car in piles of about 14 bricks high. The brick stacks may have different configurations but typically the bricks are stacked so as to minimize the thickness of the stack, thereby allowing the hot gases in the kiln to more quickly and evenly heat the brick. The brick stacks are typically arranged in rows with rows being separated by a distance of 2 to 6 inches which allows better hot gas circulation resulting in quicker and more even firing of the bricks. Accordingly, the brick loaded kiln car presented an extremely large mass (on the order of 285 to 365 lbs/ft$^2$) and cross section (of both brick and kiln car) passing through the kiln.

SUMMARY OF THE INVENTION

It is an object of the present invention to provide an apparatus and method for producing kiln fired building bricks, including solid and cored bricks, face brick, load bearing and other standard types of brick, in a more energy efficient and less labor intensive manner.

It is another object of the present invention to provide a brick producing facility having significantly lower capital and operating costs, greater product flexibility (i.e., the ability to quickly change from the production of one type of brick to another), and able to provide a higher quality brick product through simplified quality controls.

It is a further object of the present invention to provide a novel low profile dryer and kiln, in combination with low mass kiln cars carrying shorter stacks of bricks, which is able to utilize a greatly shortened drying and firing cycle.

It is a still further important object of the present invention to provide a method and apparatus for manufacturing building and other types of brick requiring a minimum of excess (or surge) production, utilizing highly dependable and easily, operated equipment, and designed to operate automatically thereby minimizing the number of operating personnel.

It is another objective of one embodiment of the present invention to provide a kiln which is capable of shutting down completely without danger of kiln damage and without the extended time required for cooling down (during shutdown of the kiln) and heating up (during startup of the kiln) thereby allowing the apparatus to be shut down over weekend and holiday periods and thereby greatly reducing the required amount of excess brick supply.

These and other important objects of the present invention are met by an apparatus, and method of using same, comprising an automated low profile dryer and kiln in conjunction with an automated brick handling system including specially designed lightweight kiln cars.

Figure 1:
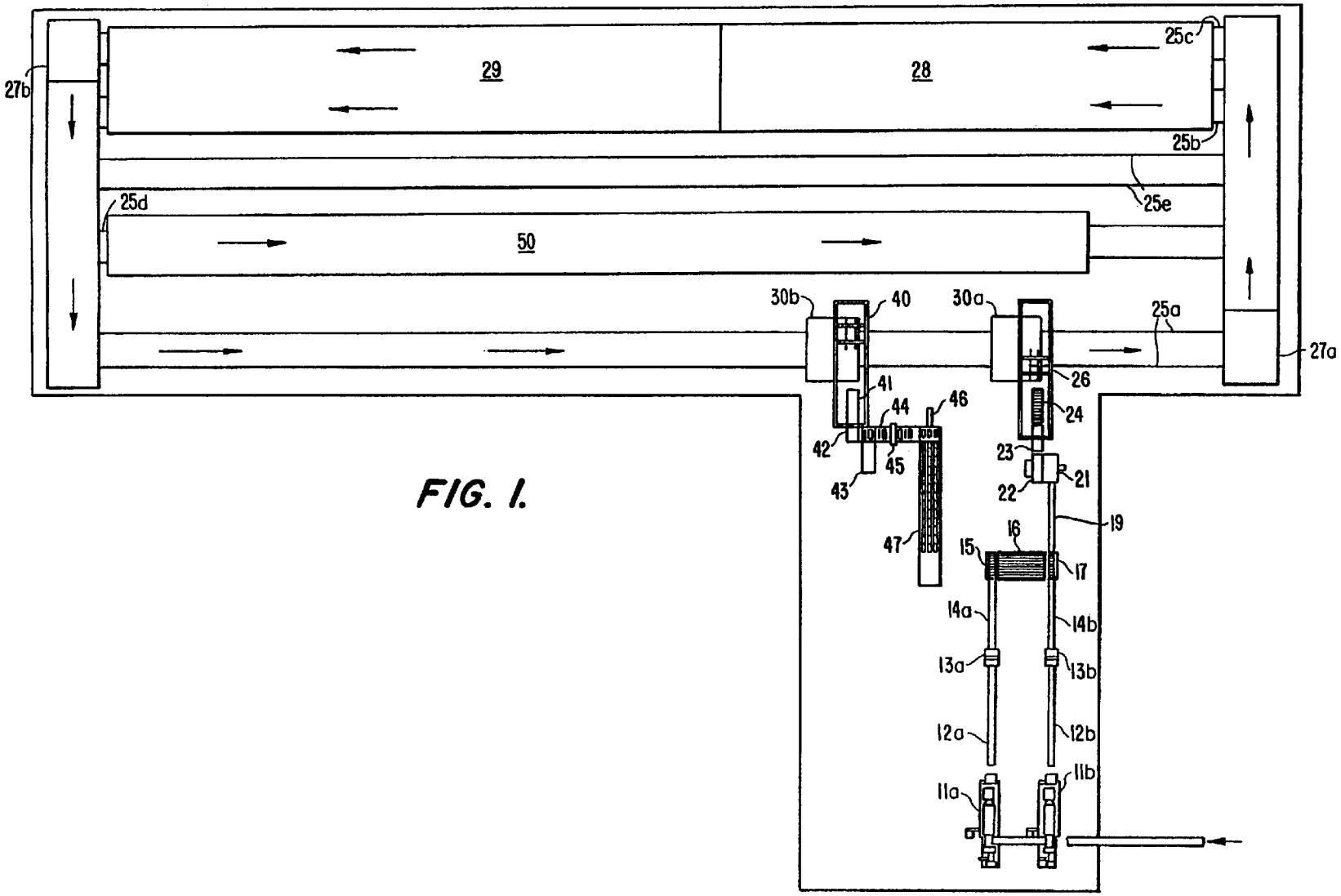
FIG. 1 is an overall plan view of a brick producing facility.

Although specific forms of apparatus have been selected for illustration in the drawings and although specific terminology will be resorted to in describing those embodiments in the specification appearing hereinafter, it will be apparent to those skilled in the art that the illustrated and described embodiments are merely examples within the broad scope of the present invention as defined in the appended claims. For example, certain equipment and materials, such as the kiln 50 having the ceramic fiber lining, have been selected for illustration in the drawings. Those skilled in the art will appreciate that a similar kiln constructed of refractory brick could also be used to achieve some of the same objectives, but without the ability to quickly startup and shutdown the kiln.

DETAILED DESCRIPTION OF THE INVENTION

Referring to the drawings, wherein like reference numerals refer to the same apparatus in the several drawings, and referring particularly to FIG. 1, there is illustrated brick producing facility 10. Facility 10 includes a pair of brick extruders 11a, 11b which each extrude the raw brick material, typically comprising a mixture of clay, water and optionally other known additives, in the form of a ribbon onto endless texturing belts 12a, 12b. Belts 12a, 12b convey the extruded ribbons to a pair of slug cutters 13a, 13b which cut the ribbon in a direction transverse to its direction of forward travel into a plurality of discreet slugs. The slugs are conveyed by acceleration belts 14a, 14b. At this point, belt 14a conveys the slugs to a slug transfer device 15 which in turn feeds the slugs onto slug conveyor 16. Slug conveyor 16 conveys the slugs from belt 14a and combines them with the slugs travelling on belt 14b on the slug transfer device 17. Thus, belt conveyor 19 carries twice the number of slugs as either of the belts 14a, 14b. Belt conveyor 19 transfers the slugs into push-through cutter 21, which cuts the slugs into individual bricks. Although bricks may be cut to any number of sizes, the brick of commercial brick comes in either 8" or 12" sizes. Individual 8" green bricks typically have dimensions on the order of 2.4"×4.0"×8.6" and weigh about 5 to 6 lbs. Twelve inch green bricks typically have dimensions of 3.9"×3.9"×12.5" and weigh about 13 to 14 lbs. The green bricks leave the push-through cutter 21 and are deposited onto transfer conveyor 22 which in turn feeds the bricks to inverting/stacking device 23. From device 23, the bricks advance to spacing table 24 from which they are loaded by machine 26 onto kiln car 30a which travels over rails 25a–25e. After the bricks 90 are loaded onto kiln car 30a, car 30a travels along rails 25 to the transfer car 27a which transfers the kiln car 30a to either one of the two sets of rails 25b, 25c leading to holding room 28. When the brick producing equipment is operated on two 10 hour shifts per day with 2 hours between each shift, it is desirable to provide a minimum of 2 hours supply (surge) of kiln cars 30, in order to allow the dryer 29 and kiln 50 to operate continuously. In some instances, it may be desirable to provide about 4 to 6 hours surge in the event of a malfunction in the production and/or handling equipment. The surge is stored in the holding room 28. At regularly scheduled intervals, a kiln car 30 moves from the holding room 28 into the dryer 29. The green bricks typically have a water content in the range of about 12 to 16% after extrusion. If bricks having such a high moisture content were introduced into kiln 50, the bricks would explode due to the rapid build-up of steam within the brick. In order to avoid this problem the bricks must first be dried in dryer 29 before introducing them into the kiln 50. The dryer 29 shown in FIG. 29 has two sets of rails 25b, 25c running therethrough. Thus in the illustrated embodiment, dryer 29 comprises two interior passages of substantially similar cross-section enabling two sets of kiln cars 30 to simultaneously pass through dryer 29. Thus, dryer 29 is actually two separate dryers, each having a set of rails 25 running therethrough and each having the same cross-sectional shape which is substantially the same as both the cross-sectional shape of the passageway 59 through kiln 50 illustrated in FIGS. 4 and 5 and the cross-sectional shape of the brick-loaded kiln car 30 illustrated in FIG. 8. Dryer 29 is supplied with hot gases exiting from kiln 50 through stack 57, which gases are mixed with ambient air to form a gas mixture having a temperature of about 350° to 550° F. This hot gas mixture is fed directly into dryer 29 in order to gradually lower the moisture content of bricks 90 below about 1% by weight. The residence time of the bricks in dryer 29 (i.e., the drying cycle) is typically on the order of about 8–27 hours. The drying cycle of the dryer 29 is significantly less than conventional prior art drying cycles which typically ran from about 30 to 60 hours. At the same time one kiln car 30 enters the dryer 29, another kiln car 30 exits the dryer 29 and is placed onto transfer car 27b which transfers the kiln car 30 to the set of rails 25d at the entrance of the kiln 50.

Figure 8:
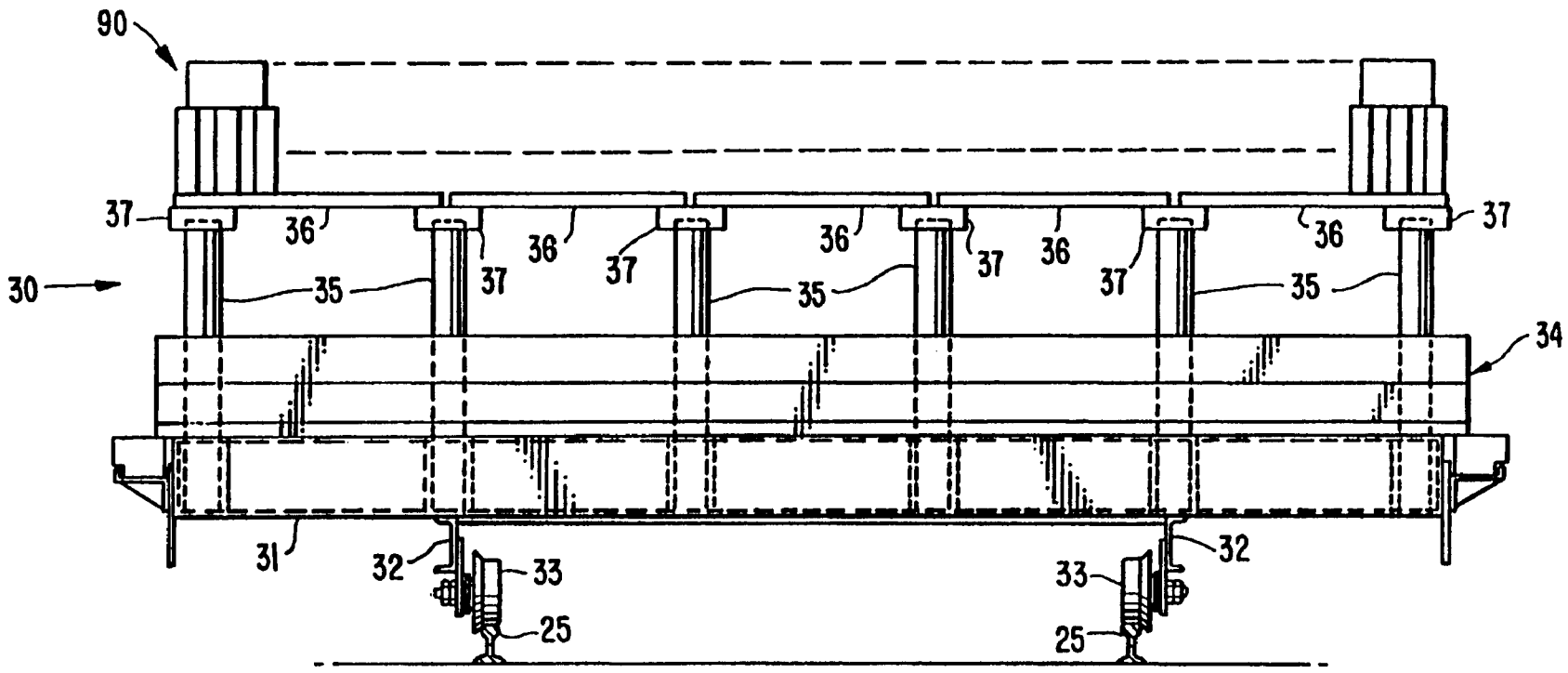
FIG. 8 is an end view of one embodiment of a low mass kiln car having bricks stacked thereon to a height of two bricks.

After the kiln car 30 has traveled along rails 25d through kiln 50 and the bricks 90 have been completely fired, the kiln car 30 is again placed onto transfer car 27a which transfers the kiln car 30 to rails 25e. Kiln car 30 then travels along the length of rails 25e and is again placed onto transfer car 27b which transfers kiln car 30 to the rails 25a. It will be readily appreciated by those skilled in the art that other rail and kiln car transfer devices could be used in place of the rails 25 and the transfer cars 27, without departing from the scope of the invention. Kiln car 30 advances along rails 25a to brick unloading machine 40. Machine 40 is shown unloading the bricks 90 from car 30b and transferring the bricks 90 to de-spacer device 41. As the bricks 90 (as shown in FIG. 8) travel through the kiln 50 on kiln car 30, the bricks 90 are stacked and spaced to allow for increased airflow around the bricks 90. When the bricks 90 are stacked to a height of two or more bricks per stack, the bricks are usually cross set to provide greater stability as is well known in this art. Cross set brick stacks are shown in FIG. 8.

After unloading by machine 40, the bricks 90 are fed to device 41 which packs the bricks 90 tightly together in preparation for packaging. From device 41, the bricks 90 are fed onto transfer device 42 which in turn feeds the bricks 90 into void making device 43. Device 43 removes some bricks from the packs to form voids into which forklift forks are adapted to be inserted for handling of the brick packs. A typical brick pack for 8 inch brick is a bundle 11 bricks wide, 10 bricks high and 5 bricks long. The bricks 90 leave device 43 and are fed into machines 44 and 45 which strap the brick packs with metal bands. The stacked and strapped brick packs are then fed onto brick transfer device 46 and eventually onto rollout conveyor 47.

In order to reduce the number of required operators and minimize excess (or surge) production, the material handling equipment described herein must be automatically controlled. The material handling process control system automatically controls all measuring, sequencing, starting, stopping and other functions of all the material handling equipment described above. The process control system enables one or two operators to supervise and control an entire production facility from one centrally located control room. The operators provide supervisory commands, typically through operator panels and cathode ray tubes (CRT's) to the process control system and the control system responds by performing pre-programmed control functions.

Figure 11:
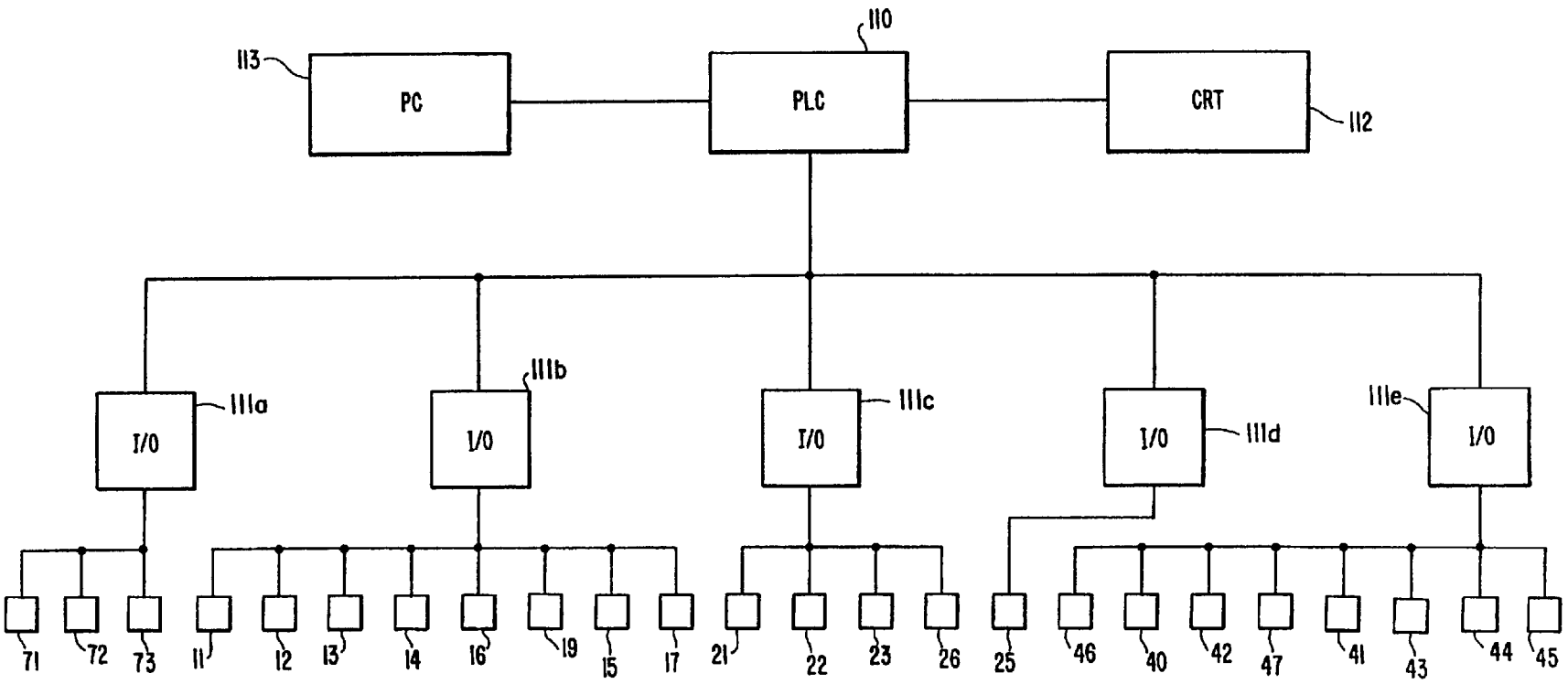
FIG. 11 is a schematic process diagram illustrating a brick handling equipment control apparatus utilized in certain embodiments of the present invention.

One example of a typical brick handling equipment control system is illustrated in FIG. 11. This process control system utilizes a programmable logic controller (PLC) 110 such as the PLC sold by Allen Bradley, Industrial Control Division, Milwaukee, WI under the trademark PLC-3™. The PLC 150 utilizes remotely mounted input/output (I/O) systems 111a–111e to interface with the various brick handling equipment. For example, I/O 111a may be used in a known manner to interface with the electrical controls (motors, starters, limit switches, sensors, selector switches, drives, etc.) for brick storage bins, dust collectors and various pumps used in the brick making process. Similarly I/O 111b interfaces with the electrical controls for the extruders 11, conveyor belts 12 and 14, cutters 13, transfer devices 15 and conveyors 16, 17, and 19. Similarly, I/O 111c interfaces with the electrical controls for the cutter 21, conveyor 22, inverting stacking device 23 and loading machine 26. Similarly, I/O 111d interfaces with the electrical controls for the spacing table 25. Also similarly, I/O 111e interfaces with the electrical controls for the unloading machine 40, device 41, transfer device 42, device 43, machines 44 and 45, transfer device 46, and conveyor 47. Thus, remote I/O's 111a–111e communicate in a known manner with the central processing unit (CPU) of the PLC 110 over twisted pair cables. The actual control logic resides in the CPU which is typically installed in the control room. The CPU adjusts the outputs to obtain the required results calculated by the control logic utilizing the inputs and solving the control algorithms. The CPU also uses industrial standard communication protocols to communicate with the CRT 112 which is also typically installed in the control room. An example of a suitable color graphic CRT is one sold by Industrial Data Terminals Corporation, Westerville, OH under the trademark IDT-2200™. The CRT 112 displays data on the screen in a combination of graphical and numerical depiction. This combination may be varied according to known methods in accordance with the quantity of the material handling equipment and individual user requirements.

A personal computer (PC) 113 may be used for long term production data storage, production reporting, and storage of preprogrammed control functions to be loaded into the PLC 110. The personal computer 113 communicates with the PLC 110 using standard communication protocols. An example of a suitable personal computer is the one sold by IBM Corporation, Armonk, NY, under the trademark Personal Computer AT™. Optionally, the personal computer 113 may also be used to supervise the kiln combustion control system 100 (described in detail hereinafter). In such a case, the personal computer would replace the programmer 101 utilized in the kiln combustion control system 100.

Those skilled in the art will appreciate that the above-described material handling control system is only one example of an approach to performing the material handling equipment control functions. These same functions may also be performed using various combinations of personal computers, digital computers, and other commercially available I/O systems.

Figure 2:
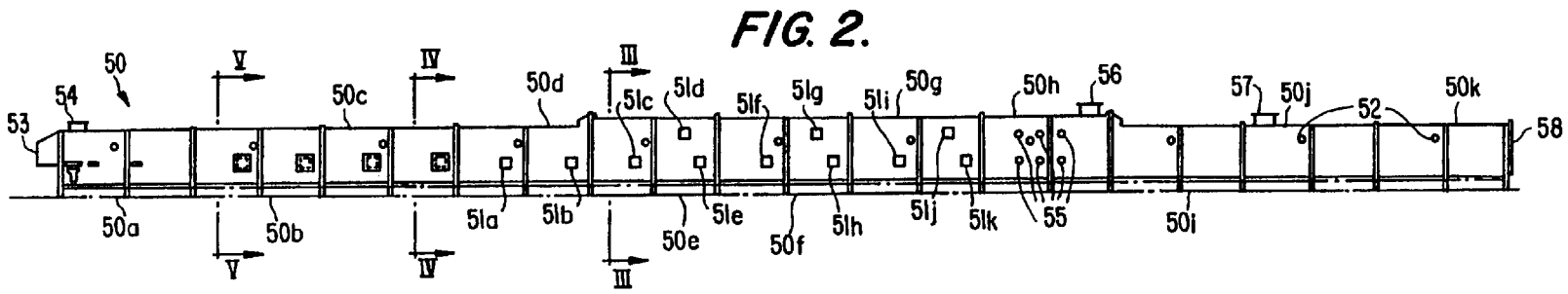
FIG. 2 is a side elevational view of a low profile kiln according to one embodiment of the present invention.

Referring now to FIG. 2, there is illustrated a longitudinal view of low profile kiln 50. Kiln 50 is divided into eleven units 50a–50k. Unit 50a represents the kiln entrance and unit 50k represents the kiln exit. Units 50a and 50b comprise the kiln early preheat zone. Units 50c and 50d comprise the kiln late preheat zone. Units 50e, 50f and 50g comprise the furnace zone. Unit 50h comprises the rapid cool zone. Unit 50i comprises the early cooling zone. Units 50j and 50k comprise the final cooling zone.

Units 50d–50g are provided with a plurality of burners 51a–51k. The number of burners 51 provided in kiln 50 is mainly dependent upon the size of the kiln and the type of brick being fired. Of course, it is always possible to install an excess number of burners 51 in kiln 50 so that all types, sizes and configurations of brick may be fired in kiln 50. More important is the configuration of the burners 51 in the kiln 50. The burners must be positioned to supply hot combustion gases both above and below the bricks stacked on deck 36 of kiln car 30. Thus, as is clearly shown in FIG. 3, a plurality of burners 51, such as burner 51d are positioned to supply hot combustion gases above bricks 90. In addition, other burners 51 (not shown) are positioned within the wall 60 of kiln 50 so as to direct hot combustion gases into the space between deck 36 and the heat barrier layer 34. In addition, each of the units 50a–50k is provided with a small viewing port 52.

A products of combustion stack 54 is provided in unit 50a for venting the burned flue gases from burners 51. Thus, as the kiln car 30 loaded with bricks 90 enters kiln unit 50a, bricks 90 are heated by hot combustion gases from the burners 51. These combustion gases flow from the furnace zone into the preheat zone and finally are exhausted through stack 54. Thus, as the kiln car 30 moves through the furnace, it experiences successively higher temperatures through the early and late preheat zones. Typically, the operating temperatures within the early preheat zones are in the range of about 300°–1000° F. The operating temperatures within the late preheat zone are typically within the range of about 1000°–1800° F. Upon entering the furnace zone, the bricks are subjected to the highest kiln operating temperatures, typically in the range of 1800°–2300° F.

An internal baffle (not shown) is provided between units 50g and 50h. This baffle acts to limit the amount of hot combustion gases passing from the furnace zone into the rapid cool zone. Unit 50h comprising the rapid cool zone is provided with a plurality of cooling air nozzles 55. Each nozzle 55 typically injects cooling air at ambient temperature at a rate of about 1 to 10 $ft^3$ per minute of air per lb of brick passing through the kiln per minute. Cooling air exhaust ducts 56 and 57 are provided in units 50h and 50j, respectively. The hot gases exiting kiln 50 through stack 57 are conveyed to dryer 29 and mixed with ambient air to form a supply of drying gases. An air nozzle 58 is also provided at the exit of kiln 50 in unit 50k. Nozzle 58 blows ambient cooling air into the exit end of kiln 50.

Figure 3:
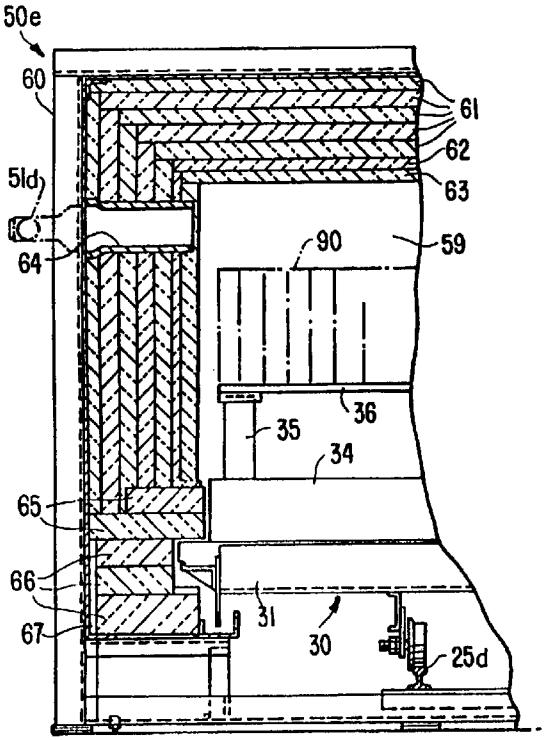
FIG. 3 is a sectional view of one side of the low profile kiln illustrated in FIG. 2 taken along lines III—III.
Figure 4:
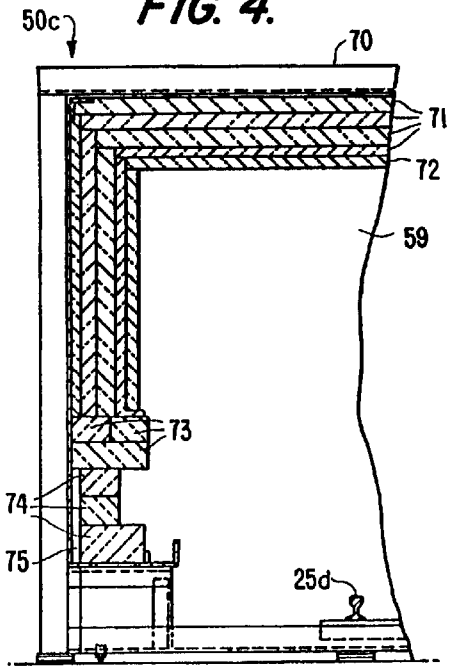
FIG. 4 is a sectional view of one side of the low profile kiln illustrated in FIG. 2 taken along lines IV—IV.
Figure 5:
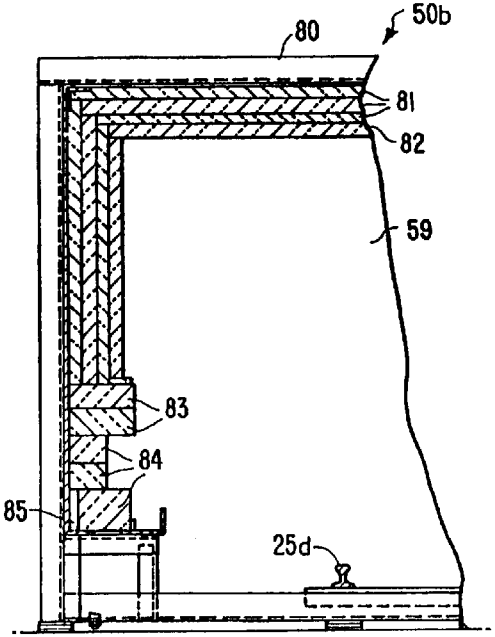
FIG. 5 is a sectional view of one side of the low profile kiln illustrated in FIG. 2 taken along lines V—V.

Referring now to FIGS. 3, 4 and 5, there are shown several cross-sectional views of various portions of kiln 50. FIG. 3 depicts the cross-sectional configuration of kiln 50 at units 50e–50g which units comprise the furnace zone of kiln 50.

The kiln 50 insulation is peferably composed of low density ceramic fibers. Particularly preferred are low mass ceramic fiber insulation blankets and low mass ceramic fiber vacuum board. These low density ceramic fiber insulation materials allow the kiln to be quickly and repeatedly started-up and shutdown in an economical manner, without risk of damaging the insulation. Although the present invention is not limited to kilns having these low density ceramic fiber insulating materials, they are greatly preferred from both efficiency and ease of operation standpoints.

Turning now to the illustrated embodiments of kiln 50 and referring specifically to FIG. 3, the furnace zone of kiln 50 typically has an overall width of about 11 feet and a height of about 6½ feet. The outer shell 60 comprising the roof and side walls of the kiln in the furnace zone is composed of steel. Lining steel shell 60 are a plurality of insulation layers. The first layer 61 comprises five individual low mass ceramic fiber insulation blankets, rated at 2300° (°F.) or less, typically having a thickness of about 2 inches. Layer 62 comprises a 2600° ceramic fiber insulation blanket while layer 63, the inner-most insulation layer, comprises 2600° ceramic fiber vacuum board having a thickness of about 1.5 inches. Surrounding upper burner 51d is a layer of 1 inch 2600° ceramic fiber insulation blanket.

Lining the lower side portions of zone 50e are 2600° ceramic furnace insulation fire bricks 65 and 2300° ceramic insulation fire bricks 66. The lower bricks 66 are packed along their exterior side with loose insulation wool 67. Ceramic insulation fire bricks 65, 66 have a much higher mass than layers 61, 62 and 63. While the low mass layers 61, 62, and 63 are preferred in the upper portion of the kiln adjacent the bricks 90 due to their ability to quickly heat up and cool down, the higher mass bricks 65, 66 are preferred in the lower portion of the kiln, which has a cross-sectional outline precisely dovetailing with the side configuration of kiln car 30, due to their increased dimensional stability and structural strength. By dovetailing bricks 65 and 66 with the heat barrier layer 34 and base 31 of kiln car 30, the amount of heat transferred to the steel superstructure of car 30 is greatly reduced.

The vertical distance between layer 34 and deck 36 is typically about 9 to 12 inches. The height of the brick stack 90 is typically about 4 to 32 inches. The vertical distance between the top of the stacked bricks 90 and layer 63 is typically 2 to 12 inches. Thus, the term "low profile" when used in describing the dryer and kiln of the present invention means a vertical height of about 15 to 56 inches, measured between layer 34 and layer 63. Previous brick making kilns have typically had a corresponding dimension of 60 to 90 inches.

Referring now to FIG. 4, there is shown a sectional view of unit 50c. Unit 50c has an outer shell 70 composed of steel similar to outer shell 60. The preheat zone of kiln 50 is provided with four individual layers of 2300° low mass ceramic fiber insulation blanket 71, each layer having a thickness in the range of 1–2 inches. The innermost layer 72 comprises 1½ inch 2300° ceramic fiber vacuum board. Insulating the lower side portions of unit 50c are 2600° ceramic insulation fire bricks 73 and 2300° ceramic insulation fire bricks 74. Bricks 73 and 74 are similarly positioned to dovetail with the side of layer 34 and base 31 of kiln car 30. Loose wool 75 is packed around the exterior surfaces of bricks 74.

Referring to FIG. 5, the early preheat zone 50b comprises a steel shell 80 lined with 2300° low mass ceramic fiber insulation blankets 81, each blanket having a thickness in the range of 1–2 inches. The inner insulation layer 82 is provided by 2300° ceramic fiber vacuum board. The lower side portions of unit 50b are insulated with 2600° ceramic insulation fire bricks 83 and 2300° ceramic insulation fire bricks 84. Bricks 83 and 84 are also positioned to dovetail with the side of layer 34 and base 31 of kiln car 30. Loose wool insulation 85 is packed against the outer surfaces of the lower bricks 84.

It should be noted that units 50a, 50b, 50j and 50k have substantially the same cross-sections and insulation configurations. Similarly, units 50c, 50d and 50i have substantially the same cross-section. In addition, unit 50h has substantially the same cross-section as units 50e, 50f and 50g except that air cooling air nozzles 55 are provided in place of burners 51.

Figure 6:
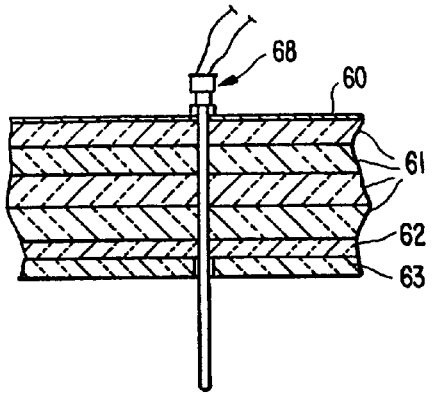
FIG. 6 is a side view, shown partly in section, of a thermocouple mounted in a portion of the kiln roof.

FIG. 6 depicts a typical mounting configuration for a thermocouple 68 positioned within the furnace zone of kiln 50. The function of thermocouple 68 will be described in more detail hereinafter.

Figure 7:
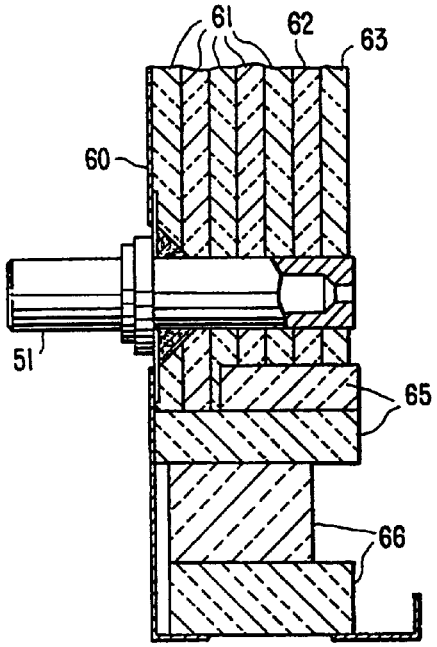
FIG. 7 is a side view, shown partly in section, of a burner assembly mounted in a portion of the kiln wall.

FIG. 7 shows a typical mounting configuration for a burner 51 positioned in the furnace zone of kiln 50.

Figure 9:
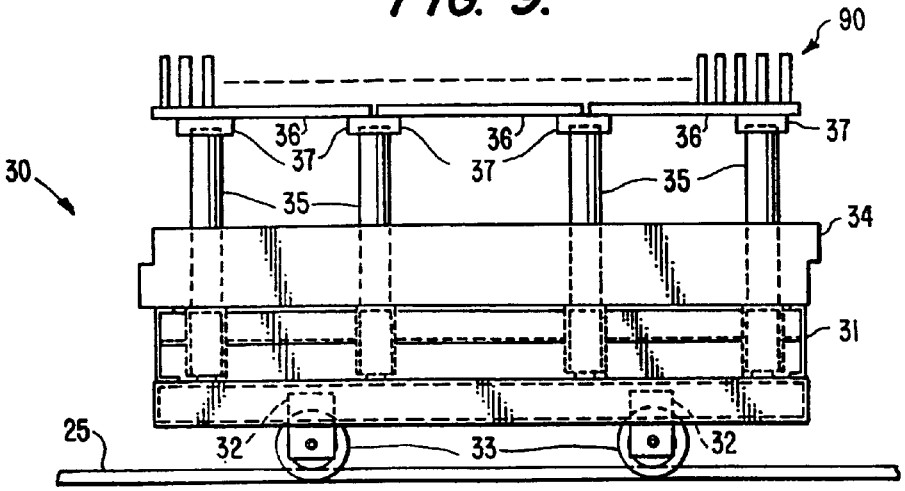
FIG. 9 is a side view of the low mass kiln car illustrated in FIG. 8 having bricks stacked thereon to a height of only one brick.

Referring now to FIGS. 8 and 9, kiln car 30 is adapted to travel along the various sets of rails 25a–25e, including rails 25d which run through kiln 50. Kiln car 30 comprises a base 31 having brackets 32 for securing flanged wheels 33 which are adapted to run on rails 25. Base 31, brackets 32 and wheels 33 are all typically constructed of steel.

Positioned above base 31 is a heat barrier layer 34. Layer 34 may be a single layer or may be composed of a plurality of different layers. For example, layer 34 may incorporate ceramic fiber insulation materials, rigid ceramic heat insulating materials such as tiles or vermiculite in particle form. Layer 34 is preferably composed of low density ceramic fiber insulation materials which help to lower the overall weight of car 30.

Secured to base 31 and passing upwardly through layer 34 are a plurality of vertical ceramic posts 35. Posts 35 are typically thin walled posts. The wall thicknesses of the posts are selected to provide adequate strength to carry the load, while at the same time restricting the heat conduction path from the bricks 90 to the base 31.

When the kiln car 30 is in use, the load of bricks is supported by an upper deck 36 composed of a plurality of ceramic plates. Caps 37 are provided for greater support.

Kiln car 30 is a low mass car having a refractory unit weight of less than about 60 lbs/ft$^2$ of deck 36 space preferably less than about 40 lbs/ft$^2$ of deck 36 space.

When the kiln car 30 travels through the kiln 50, the bricks 90 are stacked only to a height of 1–8 bricks rather than to a height of about 12–16 bricks as was typically done in the past. While stacking the bricks to a height of about 2–4 bricks is a preferred method according to the present invention, it is also acceptable to utilize stacks having up to about 8 bricks. Adjacent stacks are typically spaced about 2 to 6 inches from one another. This results in a brick mass of about 5 to 140 lbs/ft$^2$ of deck 36 space. This restricted brick stacking height, in combination with the low mass kiln cars and the low profile kilns described earlier, result in loaded kiln car masses in the range of about 65 to 165 lbs/ft$^2$ and permit greatly shortened firing cycles of 6–20 hours, as compared with conventional brick kiln firing cycles of 30–80 hours. For the purposes of the present invention, the term "firing cycle" is the length of time during which a brick 90 travels through the kiln 50.

Figure 10:
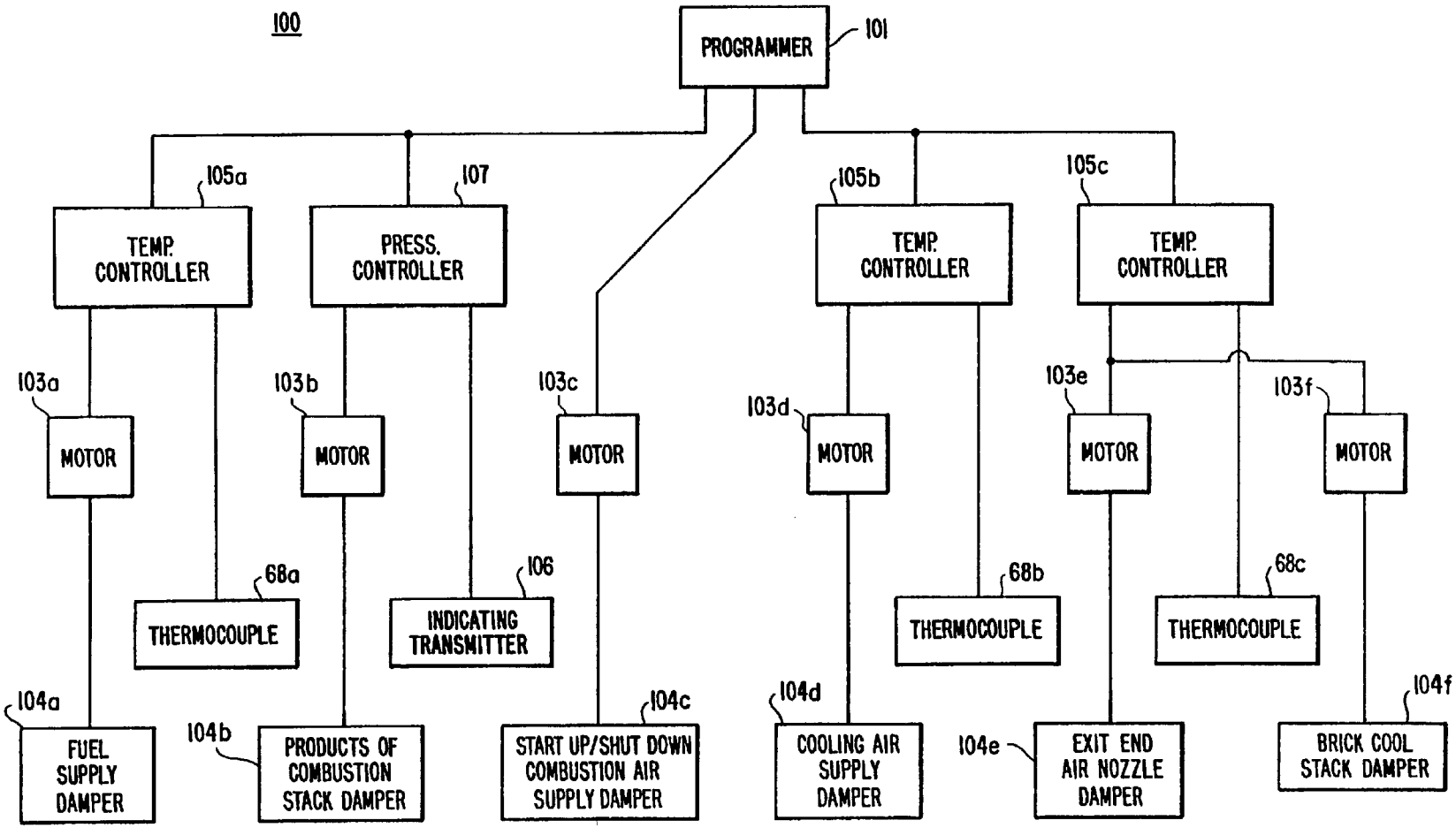
FIG. 10 is a schematic process diagram illustrating a kiln temperature control apparatus utilized in certain embodiments of the present invention.

Referring now to FIG. 10, there is shown one embodiment of a kiln combustion and temperature control apparatus which may be used in controlling the operation of kiln 50 according to the present invention. It will be understood by those skilled in the art that this is merely one example of a kiln control apparatus and that many individual components of the automatic kiln control system 100 may be substituted for those components described hereinafter, in practicing the present invention.

The heart of the kiln combustion control system 100 comprises a programmer 101. Programmer 101 is a microprocessor which is programmed to control the kiln 50 start-up and shut-down cycles. As a specific example of a suitable programmer 101 there can be mentioned a programmer sold by Leeds & Northrup Company, North Wales, PA under the trademark Process Programmer 1300™ which is provided with software which can be programmed to provide a set of start-up and shut-down temperature control strategies. In the case of control system 101, these temperature control strategies comprise kiln operating temperatures which are transmitted to temperature process controllers described in detail hereinafter.

The kiln 50 start-up cycle is designed to control the operation of the kiln 50 in such a manner as to bring the kiln from ambient temperatures to operating temperatures. Conversely, the kiln 50 shut-down cycle is designed to control the operating parameters of kiln 50 in bringing the kiln from operating temperatures down to ambient temperatures. Since the start-up and shut-down cycles are essentially similar, only the start-up cycle will be described in detail herein.

First, the blower (not shown) feeding combustion air to the burners 51, the fan (not shown) in the stack 54, the fan (not shown) in the cooling air exhaust ducts 56 and 57, the fans (not shown) in the air nozzles 55 and 58, the burners 51a–51k are manually started. Next, all the fuel valves to burners 51a–51k are turned up according to a preprogrammed time/temperature curve from the programmer 101. The preprogrammed time/temperature curve may be either substantially linear or stepped. The time to bring the kiln from ambient to operating temperature is typically about 3 to 5 hours. This time is principally limited by the type of brick being fired since the loaded cars are usually left in the kiln during start-up and shut-down.

The combustion blower and the fan in stack 54 are also under the control of the programmer 101. The fans in the exhaust ducts 56, 57 and the exit end fan are automatically controlled according to a second pre-programmed time/temperature curve from the programmer 101. The second preprogrammed time/temperature curve gives the kiln 50 the flexibility of having slightly differing time/temperature curves at the heating and cooling ends of kiln 50, during the start-up and shut-down cycles.

In the hottest part of the kiln (i.e., in units 50e, 50f and 50g), the temperature is raised approximately linearly over a period of about 3–4 hours from ambient temperature to a temperature in the range of about 2000°–2100° F.

At the end of the start-up cycle the kiln is at operating conditions. At this time, the temperature profile within the kiln is maintained by first establishing a plurality of desired operating setpoint temperatures at various positions within kiln 50. For instance, the operating temperature in the hottest portion of the kiln should typically be in the range of 2000°–2100° F. Thus, the setpoint temperature in units 50d–50g is typically set within the range. The setpoint temperature is transmitted from programmer 101 to a temperature microprocessor controller 105a. As a specific example of a suitable microprocessor controller 105, there can be mentioned one sold by Leeds & Northrup Company under the trademark Microprocessor Controller™. Controller 105a has both high and low temperature alarms defining an acceptable operating temperature deviation from the setpoint temperature. Typically, the range of deviation from the setpoint temperature. Typically, the range of deviation from the setpoint temperature is on the order of 0°–10° F. Similarly, a setpoint temperature in the range of 1000°–1800° F. is established in the preheat zone. This and, optionally, additional setpoint temperatures are transmitted from programmer 101 to temperature microprocessor controllers 105 (not shown). These controllers 105 are also provided with high and low temperature alarms. Of course, it will be recognized by those skilled in the art that these setpoint values and deviation ranges may be changed to suit any number of considerations, including the particular portion of the kiln 50 being controlled, the type of brick material being fired, as well as the operating requirements of the individual user.

In the case of temperature control in the furnace zone of kiln 50, a motor 103a is connected to a fuel supply damper 104a, positioned within the fuel supply line supplying fuel to the set of burners 51a–51k. A thermocouple 68a is provided adjacent said set of burners 51 to sense the temperature in this portion of kiln 50. Thermocouple 68a transmits to temperature controller 105a the temperature in the unit 50f. In normal operation of the kiln combustion control system 100, the transmitted signal from thermocouple 68a is received by temperature controller 105a and compared with the setpoint temperature transmitted from programmer 101. The controller 105a then makes output changes, if necessary, which are transmitted to motor 103a controlling fuel supply damper 104a. However, in the event of some mechanical or other problem with motor 103a and/or fuel supply damper 104a, making the system unable to effectively control the temperature within this portion of kiln 50, the temperature controller 105a is provided with both high and low temperature alarms which sound in the event of some malfunction causing the temperature sensed by thermocouple 68a to either rise above or fall below the range of deviation transmitted from programmer 101.

Similarly, a microprocessor based controller 107, such as the Leeds & Northrup Microprocessor Controller™, is used to control the operating pressure in the kiln 50. A pressure sensing transmitter 106 is appropriately positioned within unit 50a. In the normal mode of operation, the pressure controller 107 receives the transmitted pressure value from the pressure sensing transmitter 106 and compares this value to a setpoint value (typically within the range of about −0.5 to 0.5 (gauge) psi) and then makes output changes, if necessary, which are transmitted to motor positioner 103b. Motor positioner 103b adjusts the products of combustion damper 104b to maintain the kiln 50 pressure at the setpoint value. However, in the event of some mechanical or other malfunction with either motor 103b or damper 104b, the pressure controller 107 is provided with both low and high pressure alarms. Typically, the pressure deviation from the setpoint pressure will be on the order of about ±0.02 in $H_2O$. Thus, in the event of some malfunction wherein the operating pressure within unit 50a falls either below or above the predetermined limits, an alarm will sound alerting an operator to the malfunction.

Programmer 101 also directly controls motor 103c which in turn controls combustion air supply damper 104c. Damper 104c does not move during normal operating cycles of kiln 50. Rather, control of damper 104c is provided specifically for the start-up and shut-down cycles of kiln 50.

Control system 100 also includes a means for controlling the amount of cooling air supplied to kiln 50. Another thermocouple 68b is positioned to sense the temperature of kiln 50 in the region of the cooling air supply nozzles. Thermocouple 68b transmits to temperature controller 105b the temperature in the kiln 50 in the cooling region. The control of motor 103d and damper 104d is substantially the same as the control described above for motor 103a and damper 104a, and need not be repeated herein.

Control system 100 also includes a means for controlling the amount of cooling air supplied to exit end air nozzle 58. Thermocouple 68c is provided within unit 50k in order to sense the temperature within this portion of the kiln. Thermocouple 68c transmits to temperature controller 105c the temperature within unit 50k. Motor 103e moves exit end air nozzle damper 104e. The control of this portion of the apparatus is substantially the same as for motor 103d and damper 104d. In addition, motor 103f and brick cool stack damper 104f are provided adjacent exhaust ducts 56 and 57. Although only one such motor 103f and damper 104f are shown in FIG. 10, it will be readily understood by those skilled in the art that an identical motor and damper unit is provided in each of the stacks 56 and 57. Motor 103f is electrically slaved to motor 103e through controller 105c. Thus, the control of damper 104f is directly proportional to the control of damper 104e. In this way, the kiln 50 can adequately vent, through exhaust ducts 56 and 57, the cooling air supplied by nozzle 58.

Although the present invention has been described in terms of a number of specific examples and embodiments thereof, it will be appreciated by those skilled in the art that a wide variety of equivalents may be substituted for the specific parts and steps of operation described herein. For instance, the kiln combustion control apparatus just described is only one of many suitable control systems. For example, in place of the individual controllers a PLC (Programmable Logic Controller), DCS (distributed control system) or similar microprocessor-based control system could be used, all without departing from the spirit and scope of the present invention, as defined in the appended claims.

We claim:

1. A method of drying and firing bricks having a moisture content above about 1% by weight, comprising:

a. loading the bricks onto a kiln car adapted to convey the bricks through a dryer and a kiln, the car having an elevated deck for supporting the bricks and an unloaded mass of about 25 to [60] *40* lbs/ft$^2$ of the deck, the bricks being stacked on the deck to a height of 1 to 8 bricks, the loaded brick having a mass of about 5 to 140 lbs/ft$^2$ of the deck;

b. gradually lowering the brick moisture content over a period of about 8 to 27 hours to below about 1% by weight by conveying the loaded kiln car through an interior passage of the dryer, the dryer passage having a low cross-sectional profile;

c. thereafter, conveying the loaded kiln car through the kiln for a period of about 6 to 20 hours, the kiln comprising a heating zone, a furnace zone and a cooling zone, the kiln having a passage through said zones, the passage having substantially the same cross-sectional profile as the cross-sectional profile of the interior passage of the dryer, the furnace zone having a plurality of fuel burners, and the kiln having a temperature sensor and a pressure sensor;

d. automatically sensing the temperature in the kiln, comparing the sensed temperature to a setpoint temperature and adjusting a damper in a gas conveying line in response thereto; and e. automatically sensing the pressure in the kiln, comparing the sensed pressure to a setpoint pressure and adjusting a damper in a products of combustion stack in response thereto.

2. The method of claim 1, including stacking the bricks to a height of 2 to 4 bricks.

3. The method of claim 1, including sensing the temperature in the furnace zone of the kiln and setting the setpoint temperature in the range of about 1800° to 2300° F.

4. The method of claim 1, including setting the setpoint pressure within the range of about −0.5 to 0.5 (gauge) psi.

5. The method of claim 1, including controlling the pressure in the kiln to within a predetermined deviation from the pressure setpoint.

6. The method of claim 1, including controlling the temperature in the furnace zone to within a predetermined deviation of the temperature setpoint.

7. A method of using an apparatus for drying and firing bricks having a moisture content above about 1% by weight, the apparatus including a dryer having at least one interior passage with a low cross-sectional profile for gradually lowering the brick moisture content of the bricks to below about 1% by weight, a kiln comprising a heating zone, a furnace zone and a cooling zone, the kiln having a passage through said zones, the passage having a cross-sectional profile of the dryer, the furnace zone having a plurality of fuel burners, some of the burners being positioned below the bricks as they travel through the kiln and other of the burners being positioned above the bricks as they travel through the kiln, the kiln further having a temperature sensor and a pressure sensor, a kiln car for conveying the bricks through the kiln, the car having an elevated deck for supporting the bricks, and means for automatically sensing and controlling the temperature and pressure in the kiln, the method comprising:

a. loading the bricks onto the kiln car for conveying the bricks through the dryer and the kiln, the kiln car having an unloaded mass of about 25 to [60] *40* lbs/ft$^2$, the bricks being stacked on the deck to a height of 1 to 8 bricks, the loaded bricks having a mass of about 5 to 140 lbs/ft$^2$ of the deck;

b. gradually lowering the brick moisture content to below about 1% by weight by conveying the loaded kiln car through the interior passage of the dryer over a period of about 8 to 27 hours;

c. thereafter, conveying the loaded kiln car through the kiln over a period of about 6 to 20 hours;

d. automatically sensing the temperature in the kiln, comparing the sensed temperature to a setpoint temperature and adjusting a damper in a gas conveying line in response thereto; and e. automatically sensing the pressure in the kiln, comparing the sensed pressure to a setpoint pressure and adjusting a damper in a products of combustion stack in response thereto.

8. The method of claim 7, including insulating the kiln with low density ceramic fiber insulation materials.

9. The method of claim 8, wherein the insulation materials are selected from the group consisting of low density ceramic fiber insulating blankets, ceramic fiber vacuum board and ceramic insulation fire bricks.

10. The method of claim 8, including conveying the kiln car over rails running through the passages.

11. The method of claim 8, including sensing the temperature with a pressure-sensing transmitter.

12. The method of claim 8, wherein the pressure sensing means comprises a pressure-sensing transmitter.

13. The method of claim 8, including controlling the temperature profile in the kiln with a programmable microprocessor.

14. The method of claim 13, including controlling the temperature and pressure in the kiln with a plurality of temperature microprocessor controllers and a pressure microprocessor controller.

15. The method of claim 14, including controlling the temperature of a portion of the kiln to within a predetermined deviation from a temperature setpoint using a microprocessor.

16. The method of claim 12, including controlling the pressure in a portion of the kiln to within a predetermined deviation from a pressure setpoint using a microprocessor.

* * * * *